(12) United States Patent
Babu et al.

(10) Patent No.: US 10,243,840 B2
(45) Date of Patent: Mar. 26, 2019

(54) NETWORK INTERFACE CARD SWITCHING FOR VIRTUAL NETWORKS

(71) Applicant: Juniper Networks, Inc., Sunnyvale, CA (US)

(72) Inventors: Thilak Raj Surendra Babu, Milpitas, CA (US); Xiao Hu, San Jose, CA (US); Stephen Su, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 49 days.

(21) Appl. No.: 15/447,021

(22) Filed: Mar. 1, 2017

(65) Prior Publication Data

US 2018/0254981 A1  Sep. 6, 2018

(51) Int. Cl.
*G06F 13/12* (2006.01)
*H04L 12/46* (2006.01)
(Continued)

(52) U.S. Cl.
CPC ............ *H04L 45/26* (2013.01); *G06F 13/128* (2013.01); *H04L 12/4641* (2013.01);
(Continued)

(58) Field of Classification Search
CPC ... H04L 45/26; H04L 12/4641; H04L 45/586; H04L 61/2592; H04L 69/324
See application file for complete search history.

(56) References Cited

U.S. PATENT DOCUMENTS

| 5,027,354 A | 6/1991 | Ara et al. |
| 5,251,205 A | 10/1993 | Callon et al. |

(Continued)

FOREIGN PATENT DOCUMENTS

| CN | 1791054 A | 6/2006 |
| CN | 1913482 A1 | 2/2007 |

(Continued)

OTHER PUBLICATIONS

Zhu et al., "Tunnel Congestion Exposure," Internet Draft: draft-zheng-tsvwg-tunnel-congestion-exposure-00, Oct. 15, 2012, 16 pp.

(Continued)

*Primary Examiner* — Kashif Siddiqui
(74) *Attorney, Agent, or Firm* — Shumaker & Sieffert, P.A.

(57) ABSTRACT

In some examples, a computing device comprises a virtual network endpoint; a network interface card (NIC) comprising a first hardware component and a second hardware component, wherein the first hardware component and the second hardware component provide separate packet input/output access to a physical network interface of the NIC, wherein the NIC is configured to receive a packet inbound from the physical network interface; and a virtual router to receive the packet from the NIC and output, using the first hardware component, in response to determining a destination endpoint of the packet is the virtual network endpoint, the packet back to the NIC, wherein the NIC is further configured to switch, in response to receiving the packet from the virtual router, the packet to the virtual network endpoint and to output, using the second hardware component, the packet to the virtual network endpoint.

19 Claims, 7 Drawing Sheets

(51) Int. Cl.
*H04L 29/08* (2006.01)
*H04L 29/12* (2006.01)
*H04L 12/713* (2013.01)
*H04L 12/721* (2013.01)

(52) U.S. Cl.
CPC ........ *H04L 45/586* (2013.01); *H04L 61/2592* (2013.01); *H04L 69/324* (2013.01)

(56) References Cited

U.S. PATENT DOCUMENTS

| | | |
|---|---|---|
| 6,760,328 B1 | 7/2004 | Ofek |
| 6,778,531 B1 | 8/2004 | Kodialam et al. |
| 6,781,959 B1 | 8/2004 | Garakani et al. |
| 6,985,490 B2 | 1/2006 | Czeiger et al. |
| 7,042,838 B1 | 5/2006 | Shand et al. |
| 7,178,059 B2 | 2/2007 | Greenspan et al. |
| 7,184,437 B1 | 2/2007 | Cole et al. |
| 7,215,667 B1 | 5/2007 | Davis |
| 7,500,014 B1 | 3/2009 | Jacobson et al. |
| 7,519,006 B1 | 4/2009 | Wing |
| 7,937,492 B1 | 5/2011 | Kompella et al. |
| 7,941,539 B2 | 5/2011 | Tripathi et al. |
| 7,965,699 B1 | 6/2011 | Accardi et al. |
| 8,018,860 B1 | 9/2011 | Cook |
| 8,018,938 B1 | 9/2011 | Fromm et al. |
| 8,089,905 B2 | 1/2012 | Umeshima |
| 8,254,273 B2 | 8/2012 | Kaminsky et al. |
| 8,291,468 B1 | 10/2012 | Chickering |
| 8,339,959 B1 | 12/2012 | Moisand et al. |
| 8,429,647 B2 | 4/2013 | Zhou et al. |
| 8,638,799 B2 | 1/2014 | Mudigonda et al. |
| 8,699,499 B2 | 4/2014 | Mulligan et al. |
| 8,750,288 B2 | 6/2014 | Nakil et al. |
| 8,755,377 B2 | 6/2014 | Nakil et al. |
| 8,767,722 B2 | 7/2014 | Kamble et al. |
| 8,806,025 B2 | 8/2014 | Hummel et al. |
| 8,909,602 B2 | 12/2014 | Soundararajan et al. |
| 8,953,441 B2 | 2/2015 | Nakil et al. |
| 8,953,443 B2 | 2/2015 | Yang et al. |
| 8,958,293 B1 | 2/2015 | Anderson |
| 8,959,185 B2 | 2/2015 | Nakil et al. |
| 9,014,191 B1 | 4/2015 | Mandal et al. |
| 9,042,383 B2 | 5/2015 | Hendel et al. |
| 9,154,416 B2 | 10/2015 | Koganti |
| 9,294,304 B2 | 3/2016 | Sindhu |
| 9,319,335 B1* | 4/2016 | Tripathi .............. H04L 12/4641 |
| 9,356,866 B1 | 5/2016 | Sivaramakrishnan et al. |
| 9,479,457 B2 | 10/2016 | Sindhu |
| 9,485,191 B2 | 11/2016 | Sindhu |
| 9,571,394 B1 | 2/2017 | Sivaramakrishnan et al. |
| 9,948,579 B1* | 4/2018 | Sivaramakrishnan ...................... H04L 49/9036 |
| 9,954,798 B2* | 4/2018 | Sindhu ................. H04L 49/253 |
| 2003/0126233 A1 | 7/2003 | Bryers et al. |
| 2004/0057378 A1 | 3/2004 | Gronberg |
| 2004/0210619 A1 | 10/2004 | Balachandran et al. |
| 2005/0108356 A1 | 5/2005 | Rosu et al. |
| 2005/0163115 A1 | 7/2005 | Dontu et al. |
| 2006/0221961 A1 | 10/2006 | Basso et al. |
| 2007/0025256 A1 | 2/2007 | Hertoghs et al. |
| 2007/0147372 A1 | 6/2007 | Liu et al. |
| 2007/0195787 A1 | 8/2007 | Alnuweiri et al. |
| 2007/0195797 A1 | 8/2007 | Patel et al. |
| 2008/0144625 A1 | 6/2008 | Wu et al. |
| 2008/0240122 A1 | 10/2008 | Richardson et al. |
| 2009/0006710 A1 | 1/2009 | Daniel et al. |
| 2009/0052894 A1 | 2/2009 | Murata |
| 2009/0199177 A1 | 8/2009 | Edwards et al. |
| 2009/0327392 A1 | 12/2009 | Tripathi et al. |
| 2010/0014526 A1 | 1/2010 | Chavan et al. |
| 2010/0057649 A1 | 3/2010 | Lee et al. |
| 2010/0061242 A1 | 3/2010 | Sindhu et al. |
| 2010/0214949 A1 | 8/2010 | Smith et al. |
| 2011/0090911 A1 | 4/2011 | Hao et al. |
| 2011/0103259 A1 | 5/2011 | Aybay et al. |
| 2011/0264610 A1 | 10/2011 | Armstrong et al. |
| 2011/0276963 A1 | 11/2011 | Wu et al. |
| 2011/0299528 A1 | 12/2011 | Yu et al. |
| 2011/0317696 A1 | 12/2011 | Aldrin et al. |
| 2012/0011170 A1 | 1/2012 | Elad et al. |
| 2012/0027018 A1 | 2/2012 | Ilyadis |
| 2012/0051358 A1 | 3/2012 | Bellagamba et al. |
| 2012/0110186 A1 | 5/2012 | Kapur et al. |
| 2012/0110393 A1 | 5/2012 | Shieh et al. |
| 2012/0170578 A1 | 7/2012 | Anumala et al. |
| 2012/0207161 A1 | 8/2012 | Uppalli et al. |
| 2012/0230186 A1 | 9/2012 | Lee et al. |
| 2012/0233668 A1 | 9/2012 | Leafe et al. |
| 2012/0257892 A1 | 10/2012 | Boyd et al. |
| 2012/0320795 A1 | 12/2012 | Shukla et al. |
| 2013/0028073 A1 | 1/2013 | Tatipamula et al. |
| 2013/0044641 A1 | 2/2013 | Koponen et al. |
| 2013/0074066 A1 | 3/2013 | Sanzgiri et al. |
| 2013/0100816 A1 | 4/2013 | Bergamasco et al. |
| 2013/0003725 A1 | 6/2013 | Hendel et al. |
| 2013/0142202 A1 | 6/2013 | Cors et al. |
| 2013/0163606 A1 | 6/2013 | Bagepalli et al. |
| 2013/0215754 A1 | 8/2013 | Tripathi et al. |
| 2013/0215769 A1 | 8/2013 | Beheshti-Zavareh et al. |
| 2013/0232492 A1 | 9/2013 | Wang |
| 2013/0235870 A1 | 9/2013 | Tripathi et al. |
| 2013/0238885 A1 | 9/2013 | Tripathi et al. |
| 2013/0242983 A1 | 9/2013 | Tripathi et al. |
| 2013/0294243 A1 | 11/2013 | Wiley et al. |
| 2013/0315596 A1 | 11/2013 | Rollet |
| 2013/0322237 A1 | 12/2013 | DeCusatis et al. |
| 2013/0329548 A1 | 12/2013 | Nakil et al. |
| 2013/0329571 A1 | 12/2013 | Shimokawa et al. |
| 2013/0329584 A1 | 12/2013 | Ghose et al. |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332601 A1 | 12/2013 | Nakil et al. |
| 2013/0346531 A1 | 12/2013 | Hummel et al. |
| 2013/0346665 A1 | 12/2013 | Freking et al. |
| 2014/0050218 A1 | 2/2014 | Kamble et al. |
| 2014/0056151 A1 | 2/2014 | Petrus et al. |
| 2014/0056298 A1 | 2/2014 | Vobbilisetty et al. |
| 2014/0059537 A1 | 2/2014 | Kamble et al. |
| 2014/0126418 A1 | 5/2014 | Brendel et al. |
| 2014/0129700 A1 | 5/2014 | Mehta et al. |
| 2014/0129753 A1 | 5/2014 | Schuette et al. |
| 2014/0146705 A1 | 5/2014 | Luxenberg et al. |
| 2014/0195666 A1 | 7/2014 | Dumitriu et al. |
| 2014/0229941 A1 | 8/2014 | Bert et al. |
| 2014/0233568 A1* | 8/2014 | Dong ..................... G06F 13/00 370/392 |
| 2014/0269321 A1 | 9/2014 | Kamble et al. |
| 2014/0301197 A1 | 10/2014 | Birke et al. |
| 2015/0032910 A1 | 1/2015 | Ben Yehuda et al. |
| 2015/0172201 A1 | 6/2015 | DeCusatis et al. |
| 2015/0244617 A1 | 8/2015 | Nakil et al. |
| 2015/0278148 A1 | 10/2015 | Sindhu |
| 2017/0019351 A1 | 1/2017 | Sindhu |
| 2017/0177396 A1* | 6/2017 | Palermo ............. G06F 9/45558 |
| 2017/0257326 A1* | 9/2017 | Bogdanski ............. H04L 45/04 |

FOREIGN PATENT DOCUMENTS

| | | |
|---|---|---|
| CN | 101040471 A | 9/2007 |
| CN | 101150499 A1 | 3/2008 |
| CN | 101658001 A | 2/2010 |
| CN | 102281148 A | 12/2011 |
| CN | 102821038 A | 12/2012 |
| CN | 102857494 A | 1/2013 |
| EP | 0298136 A1 | 1/1989 |
| EP | 1482689 A2 | 12/2004 |
| EP | 1549002 A1 | 6/2005 |

(56) References Cited

FOREIGN PATENT DOCUMENTS

| WO | 2008088402 A1 | 7/2008 |
|----|---------------|--------|
| WO | 2013184846 A1 | 12/2013 |

OTHER PUBLICATIONS

Kim et al, "Internet Protocol Engine in TCP/IP Offloading Engine," 10th International Conference on Advanced Communication Technology, Feb. 17-20, 2008, 6 pp.
"Amazon CloudWatch Developer Guide API Version Aug. 1, 2010," Amazon Web Services LLC, 2011, 84 pp. (Note: Applicant points out in accordance with MPEP 609.04(a) that the 2011 year of publication is sufficiently earlier than the effective U.S. filing date and any foreign priority date of Jun. 19, 2014 so that the particular month of publication is not in issue.).
"Cloud Computing and Security—A Natural Match," Trusted Computing Group, Apr. 2010, 5 pp.
"PCI Express—An Overview of the PCI Express Standard," National Instruments, Aug. 13, 2009, 6 pp.
"TNC IF-MAP Binding for SOAP," TCG Trusted Network Connect, Specification version 2.1, Revision 15, May 7, 2012, 81 pp.
"Trusted Multi-Tenant Infrastructure Work Group FAQ," Trusted Computing Group, Sep. 2010, 2 pp.
Handigol et al., "Aster*x: Load-Balancing Web Traffic over Wide-Area Networks," 9th GENI Engineering Conference (GEC9), Nov. 2, 2010, 4 pp.
Hopps, "Analysis of an Equal-Cost Multi-Path Algorithm," Network Working Group, RFC 2992, Nov. 2000, 8 pp.
Marques et al., "BGP-signaled end-system IP/VPNs," drafl-ietf-I3vpn-end-system-00, Network Working Group, Internet-Draft, Oct. 2012, 21 pp.
David, "An overview of direct memory access," The Infinite Loop—Tales from a lean programmer, Apr. 27, 2014, accessed from https://geidav.wordpress.com/2014/04/27/an-overview-of-direct-memory-access/, 6 pp.
"Network Interface Controller Drivers—11. I40E/IXGBE/IGB Virtual Function Driver," Data Plane Development Kit, accessed on Dec. 20, 2016, from http://dpdk.org/doc/guides-16.07/nics/intel_vf.html, 15 pp.
"I/O Virtualization," Wikipedia, the free encyclopedia, accessed on Dec. 20, 2016, from https://en.wikipedia.org/wiki/I/O_virtualization, 3 pp.
"PCI Express," Wikipedia, the free encyclopedia, accessed on Dec. 20, 2016, from https://en.wikipedia.org/wiki/PCI_Express, 21 pp.
"PCI-SIG SR-IOV Primer: An Introduction to SR-IOV Technology—Revision 2.5," Intel Corp., LAN Access Division, Jan. 2011, 28 pp.
"TCG Trusted Network Connect, TNC IF-MAP Binding for SOAP," TCG Published, Specification version 2.1, Revision 15, May 7, 2012, 81 pp.
Extended Search Report from counterpart European Application No. 18152233.5, dated Jun. 27, 2018, 7 pp.
Aggarwal et al., "BGP MPLS Based Ethernet VPN, draft-raggarwa-sajassi-12vpn-evpn-02.txt," Internet Draft, Network Working Group, Mar. 14, 2011, 42 pp.
"FCOE Convergence at the Access Layer with Juniper Networks QFX3500 Switch," White Paper, Juniper Networks, Inc., Jul. 2011, 14 pp.
"PCI Express Base Specification Revision 3.0," PCI Express, PCI Special Interest Group (PCI-SIG), Nov. 10, 2012, 860 pp.
"The QFabric Architecture—Implementing a Flat Data Center Network," White Paper, Juniper Networks, Inc., Feb. 2013, 26 pp.

\* cited by examiner

NETWORK INTERFACE CARD SWITCHING FOR VIRTUAL NETWORKS

TECHNICAL FIELD

The disclosure relates to computer networks and, more specifically, to implementing virtual networks over a physical network.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, techniques are described for using a network interface card-based switch of a computing device to switch packets for virtual networks between a tunnel endpoint for the virtual networks and virtual network endpoints hosted by the computing device. For example, a computing device may use virtualization techniques to host multiple virtual machines or containers, e.g., that are corresponding endpoints for one or more virtual networks. The computing device may also execute a software-based virtual router that determines, based on the tunnel encapsulation header and the layer 3 packet header for a packet, the virtual network endpoint for the packet received via a tunnel overlaying the data center physical switch fabric and terminated at the computing device. The virtual router may encapsulate the received packet with a layer 2 header having a layer 2 destination address that is associated with the destination endpoint for the packet, and the virtual router may output the packet to the network interface card of the computing device. An internal layer 2 switch of the network interface card, which may be a Single Root Input/Output Virtualization (SR-IOV) network interface card switch, switches the packet based on the layer 2 header to the destination endpoint.

For packets output by virtual network endpoints for delivery via the virtual networks, the virtual network endpoints are configured to output, to the internal layer 2 switch of the network interface card, the packets with layer 2 headers destined to the virtual router. For each such outbound packet, the internal layer 2 switch switches the packet to the virtual router, which determines the virtual network for the packet and outputs, to the physical destination computing device, the packet encapsulated with a tunnel encapsulation header that indicates the virtual network.

The techniques may provide one or more advantages. For example, because the path of the packet between the software-based virtual router and a virtual network endpoint, both hosted by the computing device, is via the network interface card switch, the applied techniques may leverage existing, underlying network interface card hardware queues and switching capabilities to perform high-speed layer 2 forwarding between the virtual router and the endpoints. Furthermore, the network interface card may use direct memory access to copy the packet between the virtual router memory address space and the virtual network endpoints, thus reducing computing device central processing unit (CPU) involvement with an inter-process memory copy. The techniques may also enable the virtual router to leverage network interface card rate-limiting and rate-shaping, as well as hardware offloading capabilities such as Generic Receive Offload (GRO), Transmission Control Protocol (TCP) Segmentation Offload (TSO), and Large Receive Offload (LRO). In addition, by using a software-based virtual router in combination with network interface card-based transfer between the virtual router and virtual network endpoints, the techniques may overcome drawbacks that may inhere in some network interface card-based virtual routers, such as limited support for protocols, increased costs for network interface cards with tunnel endpoint and virtual routing capabilities, and a more challenging development environment.

In one example, a non-transitory computer-readable storage medium comprises instructions for causing a computing device to: receive, by a network interface card of the computing device via a physical network interface of the network interface card, a packet inbound from the physical network interface, wherein the network interface card comprises a first hardware component and a second hardware component, wherein the first hardware component and the second hardware component provide separate packet input/output access to a physical network interface of the network interface card; receive, by a virtual router of the computing device, the packet from the network interface card; output, by the virtual router in response to determining a destination endpoint of the packet is a virtual network endpoint of the computing device, using the first hardware component, the packet back to the network interface card; and switch, by the network interface card in response to receiving the packet from the virtual router, the packet to the virtual network endpoint and outputting, using the second hardware component, the packet to the virtual network endpoint.

In another example, a method includes receiving, by a network interface card of a computing device via a physical network interface of the network interface card, a packet inbound from the physical network interface, wherein the network interface card comprises a first hardware component and a second hardware component, and wherein the first hardware component and the second hardware component provide separate packet input/output access to a physical network interface of the network interface card; receiving, by a virtual router of the computing device, the packet from the network interface card; outputting, by the virtual router in response to determining a destination endpoint of the packet is a virtual network endpoint of the computing device, using the first hardware component, the packet back to the network interface card; and switching, by the network interface card in response to receiving the packet from the virtual router, the packet to the virtual network endpoint and outputting, using the second hardware component, the packet to the virtual network endpoint.

In another example, a computing device includes one or more hardware-based processors coupled to a memory device; a virtual network endpoint configured for execution by the one or more processors; a network interface card comprising a first hardware component and a second hardware component, wherein the first hardware component and the second hardware component provide separate packet input/output access to a physical network interface of the network interface card, wherein the network interface card is configured to receive a packet inbound from the physical network interface; and a virtual router configured for execution by the one or more processors to receive the packet from the network interface card and output, using the first hardware component, in response to determining a destination endpoint of the packet is the virtual network endpoint, the packet back to the network interface card, wherein the network interface card is further configured to switch, in response to receiving the packet from the virtual router, the packet to the virtual network endpoint and to output, using the second hardware component, the packet to the virtual network endpoint.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
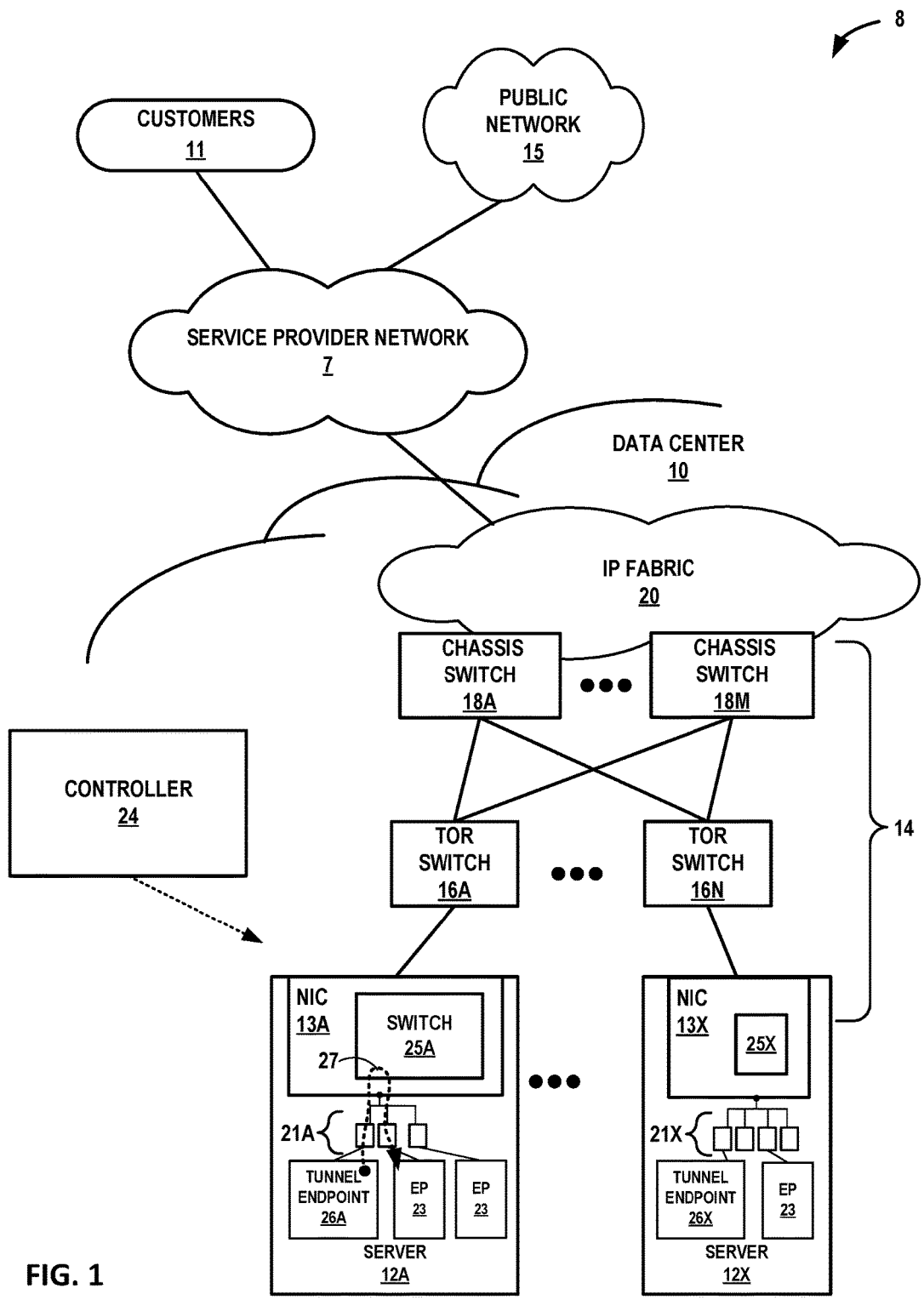
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 may also be referred to herein as "hosts" or "host devices." Although only servers coupled to TOR switch 16A are shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Servers 12 host endpoints 23 (illustrated in FIG. 1 as "EPs" 23) for one or more virtual networks that operate over the physical network represented here by IP fabric 20 and switch fabric 14. Although described primarily with respect to a data center-based switching network, other physical networks, such as service provider network 7, may underlay the one or more virtual networks.

In accordance with various aspects of the techniques described in this disclosure, one or more of servers 12 may each include a virtual router that executes one or more routing instances for corresponding virtual networks within data center 10. Each of the routing instances may be associated with a network forwarding table. Each of the routing instances may represent a virtual routing and forwarding instance (VRF) for an Internet Protocol-Virtual Private Network (IP-VPN). Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Controller 24 provides a logically and in some cases physically centralized controller for facilitating operation of one or more virtual networks within data center 10 in accordance with one or more embodiments of this disclosure. In some examples, controller 24 may operate in response to configuration input received from network administrator 24. Additional information regarding controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein.

Each of servers 12 hosts one or more virtual network endpoints 23 for the virtual networks. Each of endpoints 23 may represent a virtual machine, a container, or other virtualized execution environment that is an endpoint for a virtual network, such as a layer 3 endpoint for a virtual network. Server 12A executes two virtual network endpoints 23A and server 12X executes one virtual network endpoint 23X. However, a server 12 may execute as many endpoints as is practical given hardware resource limitations of the server 12. Each of endpoints 23 may use one or more virtual hardware components to 21 to perform packet I/O or otherwise process a packet. For example, an endpoint 23A may use one virtual hardware component (e.g., an SR-IOV virtual function) enabled by NIC 13A to perform packet I/O and receive/send packets on one or more communication links with TOR switch 16A.

In general, a virtual machine provides a virtualized/guest operating system for executing applications in an isolated virtual environment. Because a virtual machine is virtualized from physical hardware of the host server, executing applications are isolated from both the hardware of the host and other virtual machines.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

Servers 12 each includes at least one network interface card (NIC) 13, which each include at least one interface to exchange packets with TOR switches 16 over a communication link. For example, server 12A includes NIC 13A. Each of NICs 13 provides one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interface cards as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions.

NICs 13 each include an internal device switch 25 to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches 25 may be alternatively referred to as NIC switches or, for SR-IOV implementations, SR-My NIC switches. Each of virtual hardware components 21A associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch 25 may perform layer 2 forwarding to switch or bridge layer 2 packets between virtual hardware components 21A and the physical hardware component for NIC 13A. Each virtual hardware component 21 may be located on a virtual local area network (VLAN) for the virtual network for the endpoint 23 that uses the virtual hardware component 21 for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

Servers 12A-12X include respective tunnel endpoints 26A-26X. With respect to tunnel endpoint 26A, e.g., for packets received by server 12A, tunnel endpoint 26A terminates virtual network overlay tunnels. As described herein, each tunnel endpoint 26 includes, serves, or is otherwise associated with a virtual router that determines virtual networks for received packets based on tunnel encapsulation headers for the packets, and forwards packets to the appropriate destination endpoints 23 for the packets. For each of packets outbound from endpoints 23, the virtual router of tunnel endpoint 26A attaches a tunnel encapsulation header indicating the virtual network for the packet to generate an encapsulated or "tunnel" packet, and tunnel endpoint 26A outputs the encapsulated packet via overlay tunnels for the virtual networks to a physical destination computing device, such as another one of servers 12. As used herein, a virtual router may execute the operations of a tunnel endpoint to encapsulate inner packets sourced by virtual network endpoints 23 to generate tunnel packets and decapsulates tunnel packets to obtain inner packets for routing to virtual network endpoints 23.

In accordance with techniques described herein, servers 12 employ a hybrid model for internal forwarding, whereby tunnel endpoints 26 forward packets received from the switch fabric 14 via a virtual network overlay to the internal device switch 25 for forwarding to the destination endpoints 23. In the hybrid model described herein, tunnel encapsulation/decapsulation and virtual routing of packets by server 12A, e.g., is performed by tunnel endpoint 26A executed by one or more processors of the server 12A that are not processors of the NIC 13A, while switching of packets among the tunnel endpoint 26A and virtual network endpoints 23 is performed by switch 25A of NIC 13A. The virtual routing model is thus a hybrid model in that neither NIC 13A nor tunnel endpoint 26A executed by one or more processors that are not processors of the NIC 13A performs both of the (1) encapsulation/decapsulation and virtual routing and (2) switching functions for packets originated by or destined to virtual network endpoints 23.

For server 12A, for instance, internal device switch 25A switches packets for virtual networks between tunnel endpoint 26A virtual network endpoints 23A. Tunnel endpoint 26A may receive a packet 27 from the physical hardware component. The virtual router for tunnel endpoint 26A may determine, based on the tunnel encapsulation header and the layer 3 packet header for the packet 27, the virtual network endpoint 23 for the packet 27. The virtual router may encapsulate the received packet with a new layer 2 header having a layer 2 destination address that is associated with the destination endpoint 23 for the packet 27, and the virtual router may output the packet 27 to NIC 13A. Internal device switch 25A switches the packet 27 based on the new layer 2 header to the destination endpoint 23. In some cases, the new layer 2 header include a VLAN tag for the VLAN for the destination endpoint 23.

For packets output by virtual network endpoints 23A for delivery via the virtual networks, the virtual network endpoints 23A are configured to output, to the internal layer 2 switch 25A, the packets with layer 2 headers having a destination layer 2 address that is a layer 2 address for the physical hardware component or one of virtual hardware components 21A that is used by the tunnel endpoint 26A for I/O. For each such outbound packet, internal device switch 25A switches the packet to the tunnel endpoint 26A having the virtual router instance, which determines the virtual network for the packet and outputs, to the physical destination computing device, the packet encapsulated with a tunnel encapsulation header that indicates the virtual network for the source endpoint 23A and the destination endpoint for the packet.

Figure 2A:
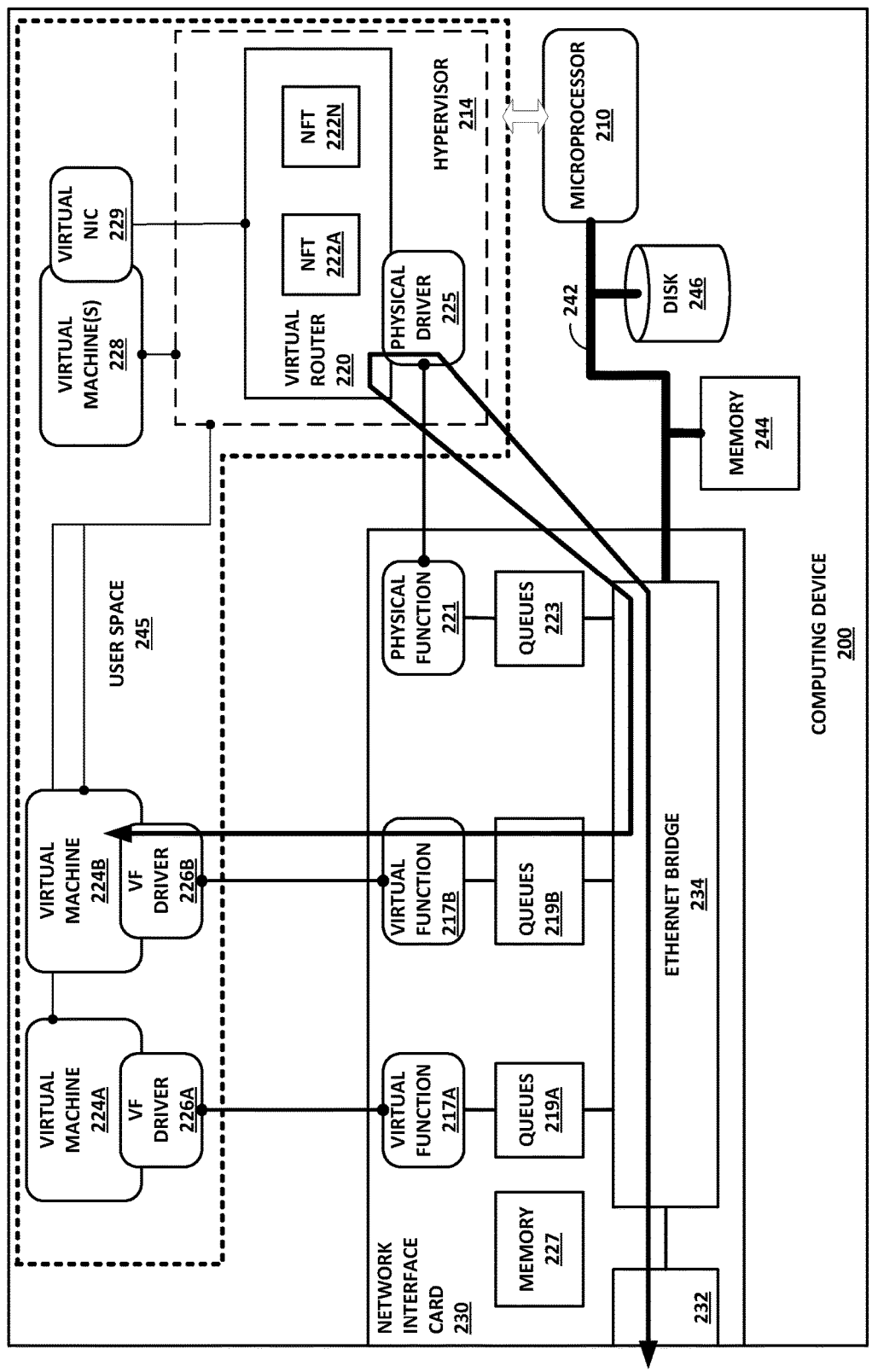
FIGS. 2A-2B are block diagrams each illustrating an example computing device that uses a network interface card internal device switch for forwarding packets between virtual network endpoints and a virtual router of a tunnel endpoint, according to techniques described herein.
Figure 2B:
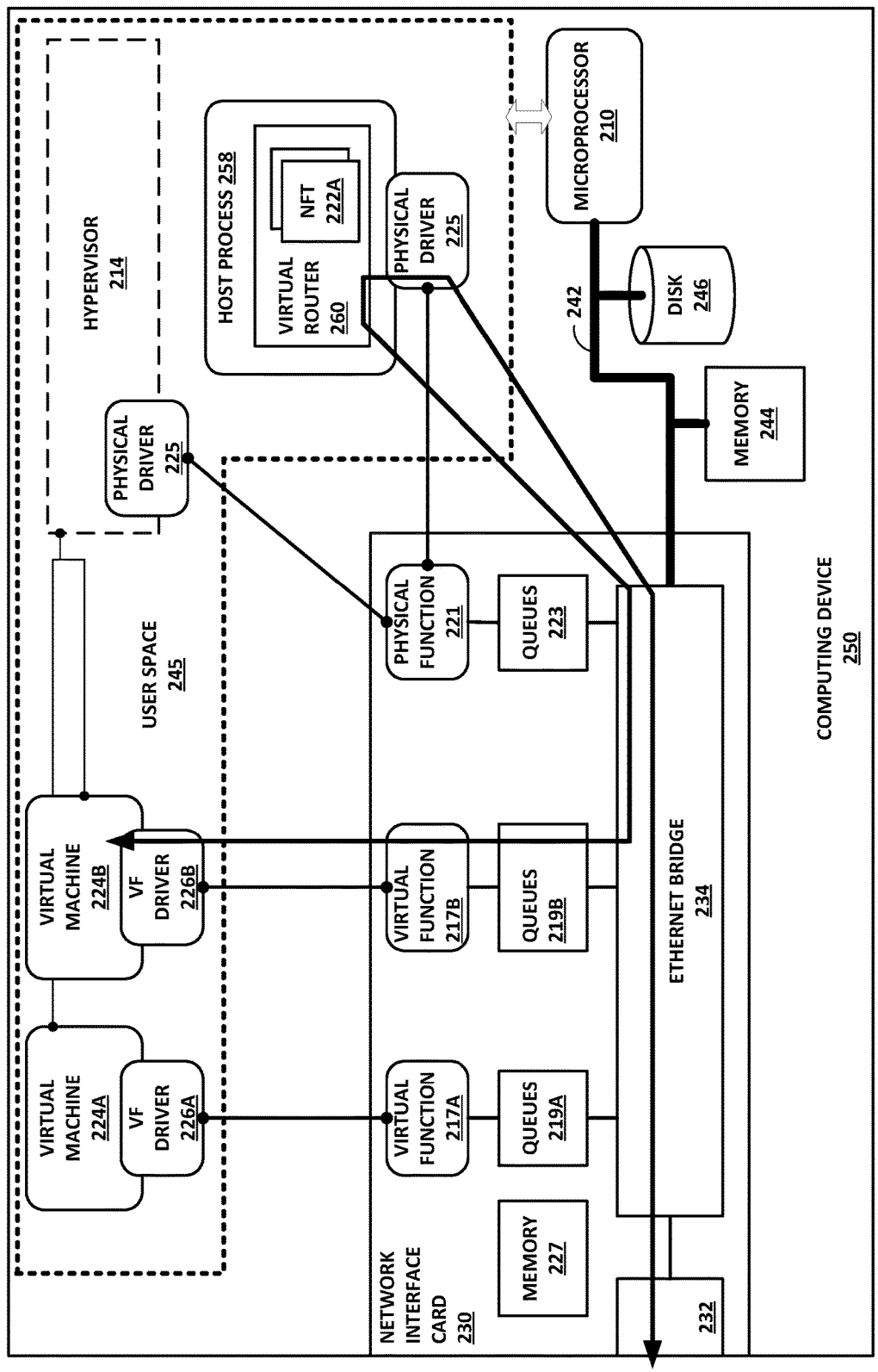

FIGS. 2A-2B are block diagrams each illustrating an example computing device that use a network interface card internal device switch for forwarding packets between virtual network endpoints and a virtual router instance associated with a tunnel endpoint, according to techniques described herein. Computing device 200 of FIG. 2A may represent a real or virtual server and may represent an example instance of any of servers 12 of FIG. 1. Computing device 200 includes in this example, a bus 242 coupling hardware components of a computing device 200 hardware environment. Bus 242 couples SR-IOV-capable network interface card (NIC) 230, storage disk 246, and microprocessor 210. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 also include an on-card memory 227 to, e.g., store packet data. Direct memory access transfers between the NIC 230 and other devices coupled to bus 242 may read/write from/to the memory 227.

Memory 244, NIC 230, storage disk 246, and microprocessor 210 provide an operating environment for a software stack that executes a hypervisor 214 and one or more virtual machines 224A-224B (collectively, "virtual machines 224"), and one or more virtual machines 228 managed by hypervisor 214. Computing device 200 may execute more or fewer virtual machines 216.

While virtual network endpoints in FIGS. 2A-2B are illustrated and described with respect to virtual machines, other operating environments, such as containers (e.g., a DOCKER container) may implement virtual network endpoints. An operating system kernel (not shown in FIGS. 2A-2B) may execute in kernel space and may include, for example, a Linux, Berkeley Software Distribution (BSD), another Unix-variant kernel, or a Windows server operating system kernel, available from Microsoft Corp.

Computing device 200 executes a hypervisor 214 to manage virtual machines 228. Example hypervisors include Kernel-based Virtual Machine (KVM) for the Linux kernel, Xen, ESXi available from VMware, Windows Hyper-V available from Microsoft, and other open-source and proprietary hypervisors. Hypervisor 214 may represent a virtual machine manager (VMM).

Virtual machines 224, 228 may host one or more applications, such as virtual network function instances. In some examples, a virtual machine 224, 228 may host one or more VNF instances, where each of the VNF instances is configured to apply a network function to packets.

Hypervisor 214 includes a physical driver 225 to use the physical function 221 provided by network interface card 230. Network interface card 230 may also implement SR-My to enable sharing the physical network function (I/O) among virtual machines 224. The shared virtual devices, virtual functions 217A-217B, provide dedicated resources such that each of virtual machines 224 (and corresponding guest operating systems) may access dedicated resources of NIC 230, which therefore appears to each of virtual machines 224 as a dedicated NIC. Virtual functions 217 may represent lightweight PCIe functions that share physical resources with the physical function 221 and with other virtual functions 216. NIC 230 may have thousands of available virtual functions according to the SR-IOV standard, but for I/O-intensive applications the number of configured virtual functions is typically much smaller. Virtual functions 217 may represent example instances of virtual hardware components 21 of FIG. 1.

Virtual functions 217A-217B may be provided with access to queue resources 219A-219B and control structures of the assigned queue resources. For global resource access, virtual functions 217 may send a request to the physical function 221, and the physical function 221 operates to access the global resources in response to the request. Each of virtual functions 217 has a different, associated layer 2 address (e.g., a MAC address). Physical function 221 has an associated layer 2 address that is different than any of the layer 2 addresses associated with the virtual functions 217. The physical function 221 layer 2 address may be considered the layer 2 address of NIC 230.

Virtual machines 224A-224B include respective virtual drivers 226A-226N presented directly into the virtual machine 224 guest operating system, thereby offering direct communication between NIC 230 and the virtual machine 224, via bus 242, using the virtual function 217 assigned for the virtual machine. This may reduce hypervisor 214 overhead involved with software-based, VIRTIO and/or vSwitch implementations in which hypervisor 214 memory address space of memory 244 stores packet data and packet data copying from the NIC 230 to the hypervisor 214 memory address space and from the hypervisor 214 memory address space to the virtual machines 217 memory address space consumes cycles of microprocessor 210.

NIC 230 further includes a hardware-based Ethernet bridge 234 to perform layer 2 forwarding between virtual functions 217 and between virtual functions 217 and physical function 221. Bridge 234 thus provides hardware acceleration, via bus 242, of inter-virtual machine 224 packet forwarding and of packet forwarding between hypervisor 214, which accesses the physical function 221 via physical driver 225, and any of virtual machines 224.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network.

In the example computing device 200 of FIG. 2A, virtual router 220 executes within hypervisor 214 that uses physical function 221 for I/O, but virtual router 220 may execute within a hypervisor, a host operating system, a host application, or one of virtual machines 224 that includes a virtual function driver 226 for virtual I/O using a virtual function 217.

The example computing device 250 of FIG. 2B is similar to computing device 200. However, computing device 250 includes a host process 258 to execute virtual router 260, rather than hypervisor 214 as for computing device 200. Host process 258 may represent a software process, application, or service executable by the host operating system (again, not shown in FIGS. 2A-2B) of computing device 250. Physical driver 225 of host process 258 uses physical function 221 for I/O with NIC 230. In some examples of computing device 250, virtual machines 224A may execute virtual router 260. In such examples, VF driver 226A uses virtual function 217A for I/O with NIC 230.

In general, each virtual machine 224, 228 may be assigned a virtual address for use within a corresponding virtual network, where each of the virtual networks may be associated with a different virtual subnet provided by virtual router 220. A virtual machine 224, 228 may be assigned its own virtual layer three (L3) IP address, for example, for sending and receiving communications but may be unaware of an IP address of the computing device 200 on which the virtual machine is executing. In this way, a "virtual address" is an address for an application that differs from the logical address for the underlying, physical computer system, e.g., computing device 200.

In one implementation, computing device 200 includes a virtual network (VN) agent (not shown) that controls the overlay of virtual networks for computing device 200 and that coordinates the routing of data packets within computing device 200. In general, a VN agent communicates with a virtual network controller for the multiple virtual networks, which generates commands to control routing of packets. A VN agent may operate as a proxy for control plane messages between virtual machines 224, 228 and virtual network controller. For example, a virtual machine may request to send a message using its virtual address via the VN agent, and VN agent may in turn send the message and request that a response to the message be received for the virtual address of the VM 36 that originated the first message. In some cases, a virtual machine 224, 228 may invoke a procedure or function call presented by an application programming interface of VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 224, 228 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-22N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

In accordance with techniques described in this disclosure, virtual router 220 of FIG. 2A performs tunnel encapsulation/decapsulation for packets sourced by/destined to any of virtual machines 224, and virtual router 220 exchanges packets with virtual machines 224 via Ethernet bridge 234 of NIC 230 and bus 242.

NIC 230 may receive tunnel packets having layer 2 headers with a destination layer 2 address that is a layer 2 address of the physical function 221, which is assigned to hypervisor 214. For each received tunnel packet, virtual router 220, via physical driver 225, receives the tunnel packet data and stores the tunnel packet data to a hypervisor 214 memory address space. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header includes a virtual network identifier, such as a VxLAN tag or MPLS label, that indicates a virtual network, e.g., a virtual network for which NFT 222A is a network forwarding table. NFT 222A may include forwarding information for the inner packet. For instance, NFT 222A may map a destination layer 3 address for the inner packet to virtual function 217B, e.g., to the layer 2 address associated with virtual function 217B and virtual machine 224B. The mapping of the destination layer 3 address for the inner packet to the layer 2 address associated with virtual function 217B may comprise an Address Resolution Protocol (ARP) entry.

Rather than sending the inner packet to the destination virtual machine 224A using a VIRTIO interface or other technique for copying the inner packet data from the hypervisor 214 memory address space to a memory address space for the virtual machine 224A guest operation system, virtual router 220 encapsulates the inner packet with a new layer 2 header having a destination layer 2 address that is the layer 2 address associated with virtual function 217B. The new layer 2 header may also include a VLAN identifier that corresponds, in computing device 200, to the virtual network of the source and destination endpoints of the inner packet. Virtual router 220 then outputs the inner packet with the new destination layer 2 address via the physical function 221 to the NIC 230. This may cause physical driver 225 or other component of computing device 200 to initiate a direct memory access (DMA) transfer to copy the inner packet with the new layer 2 header using bus 242 to NIC 240 memory. As a result, microprocessor 210 may avoid copying the packet data from one memory address space to another.

Ethernet bridge 234 inspects the new layer 2 header for the inner packet, determines that the destination layer 2 address is associated with virtual function 217B, and switches the inner packet with the new layer 2 header to add the inner packet with the new layer 2 header to an input queue of queues 219B for virtual function 217B. Placement of this data to the queue may cause the VF driver 226B or other component of computing device 200 to initiate a DMA transfer to copy the inner packet with the new layer 2 header to the virtual machine 224B memory address space using bus 242. As a result, microprocessor 210 may avoid copying the packet data from one memory address space to another. Having received the packet data in its memory address space, virtual machine 224B may process the inner packet. Hereinafter, switching operations by Ethernet bridge 234 may include adding the packet data to the corresponding input queue 219, 223 of the switched-to virtual function 217 or physical function 221, and output operations by any of virtual function drivers 226 and physical driver 225 similarly may include adding the packet to the corresponding output queue 219, 223.

Virtual machines 224 may also source inner packets as a source virtual network endpoint. Virtual machine 224B, for instance, may generate a layer 3 inner packet destined for a destination virtual network endpoint that is executed by another computing device (i.e., not computing device 200). Virtual machine 224B encapsulates the inner packet with a layer 2 header having a layer 2 destination address that is a layer 2 address of the physical function 221 to cause Ethernet bridge 234 to switch the packet to virtual router 220. VF driver 226B or another component of computing device 200 may initiate a DMA transfer to copy the inner packet with the layer 2 header from the memory address space of virtual machine 224B to the NIC 230 using bus 242. In response to the switching operation by Ethernet bridge 234, physical driver 225 or another component of computing device 200 may initiate a DMA transfer to copy the inner packet with the layer 2 header from the NIC 230 to a memory address space of the hypervisor 214 using bus 242. The layer 2 header may include a VLAN identifier that corresponds, in computing device 200, to the virtual network of the source and destination endpoints of the inner packet.

Virtual router 220 receives the inner packet and layer 2 header and determines a virtual network for the inner packet. Virtual router 220 may determine the virtual network from a VLAN identifier of the layer 2 header. Virtual router 220 uses the NFT 222 corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. Virtual router 220 outputs the tunnel packet with the new layer 2 header to NIC 230 using physical function 221. This may cause physical driver 225 to initiate a DMA transfer from the hypervisor 214 memory address space to the NIC 230 to copy the tunnel packet and the new layer 2 header to NIC 230 memory using bus 242. NIC 230 outputs the packet on an outbound interface.

Packets output by any of virtual machines 224 are received by virtual router 220 for virtual routing. In some examples, virtual router 220 operates as a default gateway or as an Address Resolution Protocol (ARP) proxy. Virtual machine 224B, e.g., may broadcast an ARP request for the default gateway, which is received and switched by bridge 234 to virtual router 220. Virtual router 220 may respond with an ARP response specifying a layer 2 address for physical function 221 as the layer 2 address for the default gateway.

In some examples, a controller for computing device 200 (e.g., controller 24 of FIG. 1) configures a default route in each of virtual machines 224 to cause the virtual machines 224 to use virtual router 220 as an initial next hop for outbound packets. In some examples, NIC 230 is configured with one or more forwarding rules to cause all packets received from virtual machines 224 to be switched, by Ethernet bridge 234, to hypervisor 214 via physical function 221.

In accordance with techniques described in this disclosure, virtual router 260 of FIG. 2B performs tunnel encapsulation/decapsulation for packets sourced by/destined to any of virtual machines 224, and virtual router 260 exchanges packets with virtual machines 224 via Ethernet bridge 234 of NIC 230 and bus 242.

NIC 230 may receive tunnel packets having layer 2 headers with a destination layer 2 address that is a layer 2 address of the physical function 221, which is assigned at least in part to host process 258. For each received tunnel packet, virtual router 260, via physical driver 225, receives the tunnel packet data and stores the tunnel packet data to a host process 258 memory address space. Virtual router 260 processes the tunnel packet to determine, from the tunnel encapsulation header, the virtual network of the source and destination endpoints for the inner packet. Virtual router 260 may strip the layer 2 header and the tunnel encapsulation header to internally forward only the inner packet. The tunnel encapsulation header includes a virtual network identifier, such as a VxLAN tag or MPLS label, that indicates a virtual network, e.g., a virtual network for which NFT 222A is a network forwarding table. NFT 222A may include forwarding information for the inner packet. For instance, NFT 222A may map a destination layer 3 address for the inner packet to virtual function 217B, e.g., to the layer 2 address associated with virtual function 217B and virtual machine 224B. The mapping of the destination layer 3 address for the inner packet to the layer 2 address associated with virtual function 217B may comprise an Address Resolution Protocol (ARP) entry.

Rather than sending the inner packet to the destination virtual machine 224B using a VIRTIO interface or other technique for copying the inner packet data from the host process 258 memory address space to a memory address space for the virtual machine 224B guest operation system, virtual router 260 encapsulates the inner packet with a new layer 2 header having a destination layer 2 address that is the layer 2 address associated with virtual function 217B. The new layer 2 header may also include a VLAN identifier that corresponds, in computing device 250, to the virtual network of the source and destination endpoints of the inner packet. Virtual router 260 then outputs the inner packet with the new destination layer 2 address via the physical function 221 to the NIC 230. This may cause physical driver 225 or other component of computing device 250 to initiate a DMA transfer to copy the inner packet with the new layer 2 header to NIC 230 memory using bus 242. As a result, microprocessor 210 may avoid copying the packet data from one memory address space to another.

Ethernet bridge 234 inspects the new layer 2 header for the inner packet, determines that the destination layer 2 address is associated with virtual function 217B, and switches the inner packet with the new layer 2 header to add the inner packet with the new layer 2 header to an input queue of queues 219B for virtual function 217B. Placement of this data to the queue may cause the VF driver 226B or other component of computing device 250 to initiate a DMA transfer to copy the inner packet with the new layer 2 header from NIC 230 to the virtual machine 224B memory address space using bus 242. As a result, microprocessor 210 may avoid copying the packet data from one memory address space to another. Having received the packet data in its memory address space, virtual machine 224B may process the inner packet.

Virtual machines 224 may also source inner packets as a source virtual network endpoint. Virtual machine 224B, for instance, may generate a layer 3 inner packet destined for a destination virtual network endpoint that is executed by another computing device (i.e., not computing device 250). Virtual machine 224B encapsulates the inner packet with a layer 2 header having a layer 2 destination address that is a layer 2 address of the physical function 221 to cause Ethernet bridge 234 to switch the packet to virtual router 220. VF driver 226B or another component of computing device 250 may initiate a DMA transfer to copy the inner packet with the layer 2 header from the memory address space of virtual machine 224B to the NIC 230 using bus 242. In response to the switching operation by Ethernet bridge 234, physical driver 225 or another component of computing device 250 may initiate a DMA transfer to copy the inner packet with the layer 2 header from the NIC 230 to a memory address space of the host process 258 using bus 242. The layer 2 header may include a VLAN identifier that corresponds, in computing device 250, to the virtual network of the source and destination endpoints of the inner packet.

Virtual router 260 receives the inner packet and layer 2 header and determines a virtual network for the inner packet. Virtual router 260 may determine the virtual network from a VLAN identifier of the layer 2 header. Virtual router 260 uses the NFT 222 corresponding to the virtual network for the inner packet to generate an outer header for the inner packet, the outer header including an outer IP header for the overlay tunnel and a tunnel encapsulation header identifying the virtual network. Virtual router 260 encapsulates the inner packet with the outer header. Virtual router 260 may encapsulate the tunnel packet with a new layer 2 header having a destination layer 2 address associated with a device external to the computing device 250, e.g., a TOR switch 16 or one of servers 12. Virtual router 260 outputs the tunnel packet with the new layer 2 header to NIC 230 using physical function 221. This may cause physical driver 225 to initiate a DMA transfer from the host process 258 memory address space to the NIC 230 to copy the tunnel packet and the new layer 2 header to NIC 230 memory using bus 242. NIC 230 outputs the packet on an outbound interface.

Packets output by any of virtual machines 224 are received by virtual router 260 for virtual routing. In some examples, virtual router 220 operates as a default gateway or as an Address Resolution Protocol (ARP) proxy. Virtual machine 224B, e.g., may broadcast an ARP request for the default gateway, which is received and switched by bridge 234 to virtual router 260. Virtual router 260 may respond with an ARP response specifying a layer 2 address for physical function 221 as the layer 2 address for the default gateway.

In some examples, a controller for computing device 250 (e.g., controller 24 of FIG. 1) configures a default route in each of virtual machines 224 to cause the virtual machines 224 to use virtual router 260 as an initial next hop for outbound packets. In some examples, NIC 230 is configured with one or more forwarding rules to cause all packets received from virtual machines 224 to be switched, by Ethernet bridge 234, to host process 258 via physical function 221.

In some cases, virtual router 260 may be executed by one of virtual machines 224. For example, virtual machine 224A may execute virtual router 260 to operate as a tunnel endpoint application and perform virtual routing, according to techniques described in this disclosure. In such cases, the above description relating to queues 223, physical function 221, and physical driver 225 would instead apply to queues 219A, virtual function 217A, and virtual function driver 226A, respectively.

Figure 3A:
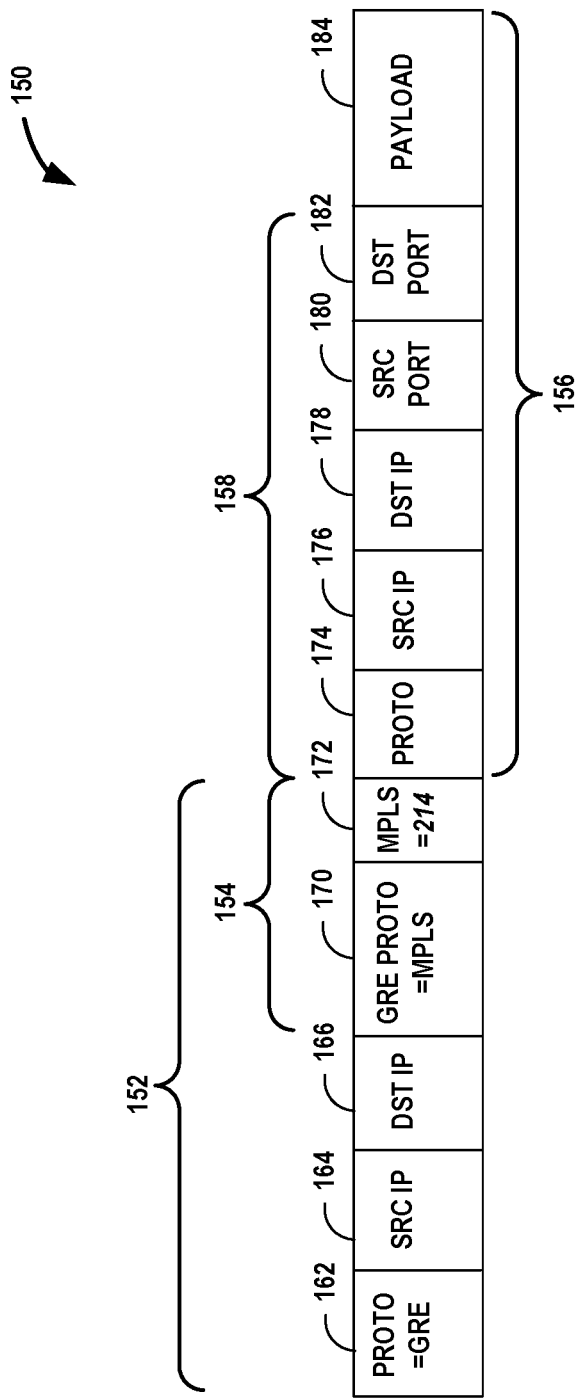
FIG. 3A is a block diagram illustrating, in detail, an example tunnel packet that may be processed by a computing device according to techniques described in this disclosure.

FIG. 3A is a block diagram illustrating, in detail, an example tunnel packet that may be processed by a computing device according to techniques described in this disclosure. For simplicity and ease of illustration, tunnel packet 150 does not illustrate each and every field of a typical tunnel packet but is offered to highlight the techniques described herein. In addition, various implementations may include tunnel packet fields in various orderings. "Outer" or "tunnel" packet 150 includes outer header 152 and inner or "encapsulated" packet 156. Outer header 152 may include protocol or type-of-service (TOS) field 162 and public (i.e., switchable by the underling physical network for a virtual network associated with inner packet 156) IP address information in the form of source IP address field 164 and destination IP address field 166. Protocol field 162 in this example indicates tunnel packet 150 uses GRE tunnel encapsulation, but other forms of tunnel encapsulation may be used in other cases, including IPinIP, NVGRE, VxLAN, and MPLS over MPLS, for instance.

Outer header 152 also includes tunnel encapsulation header 154, which in this example includes GRE protocol field 170 to specify the GRE protocol (here, MPLS) and MPLS label field 172 to specify the MPLS label value (here, 214). The MPLS label field is an example of virtual network identifier and may be associated in a virtual router (e.g., virtual router 220 of computing device 200 of FIG. 2A or virtual router 260 of computing device 250 of FIG. 2B) with a routing instance and/or NFT for a virtual network.

Inner packet 156 includes inner header 158 and payload 184. Inner header 158 may include protocol or type-of-service (TOS) field 174 as well as private (i.e., for a particular virtual routing and forwarding instance) IP address information in the form of source IP address field 176 and destination IP address field 178, along with transport layer information in the form of source port field 180 and destination port field 182. Payload 184 may include application layer (layer 7 (L7)) and in some cases other L4-L7 information produced by or for consumption by a virtual machine for the virtual network. Payload 184 may include and thus alternatively be referred to as an "L4 packet," "UDP packet," or "TCP packet."

Figure 3B:
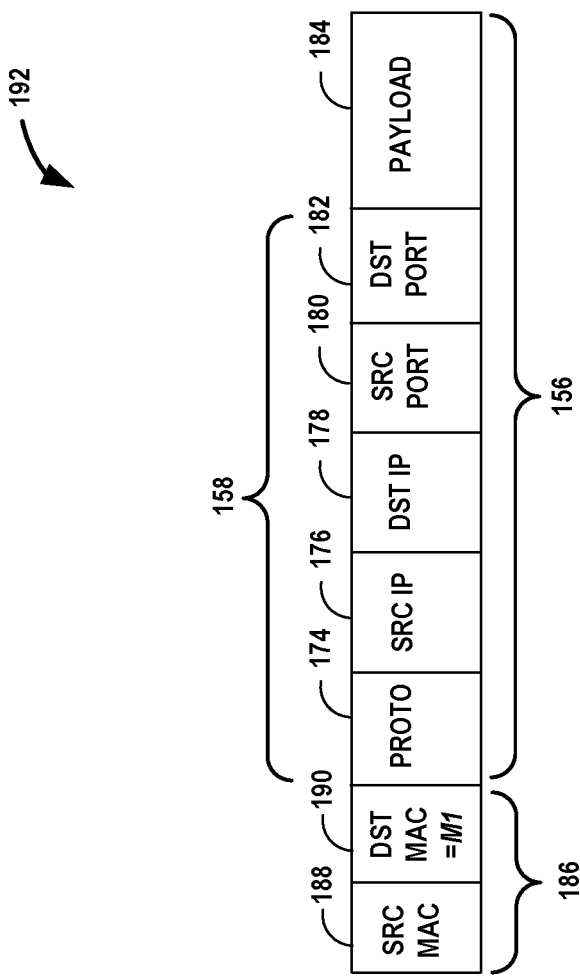
FIG. 3B is a block diagram illustrating, in detail, an example packet with a new layer 2 header generated by a virtual router for switching, by a network interface card-based switch, to the destination virtual network endpoint.

FIG. 3B is a block diagram illustrating, in detail, an example packet with a new layer 2 header generated by a virtual router for output to a network interface card for switching, by a network interface card-based switch, to the destination virtual network endpoint. Packet 192 includes inner packet 156 of FIG. 3A, the inner packet 156 being communicated between two virtual network endpoints. The virtual router 220, 260 encapsulates the inner packet 156 with a new layer 2 header 186 having source layer 2 (MAC) address 188 and destination layer 2 (MAC) address 190. The destination layer 2 address has a value M1 that is a layer 2 address associated with the virtual function 217 that is used by the virtual machine 224 that is the destination virtual network endpoint for inner packet 158. This virtual machine 224 may have a layer 3 address that is the value of destination IP address field 178. In some cases, the layer 2 header 186 may include a VLAN identifier for a VLAN associated with a virtual network that includes the destination virtual network endpoint for the inner packet 156.

Figure 4:
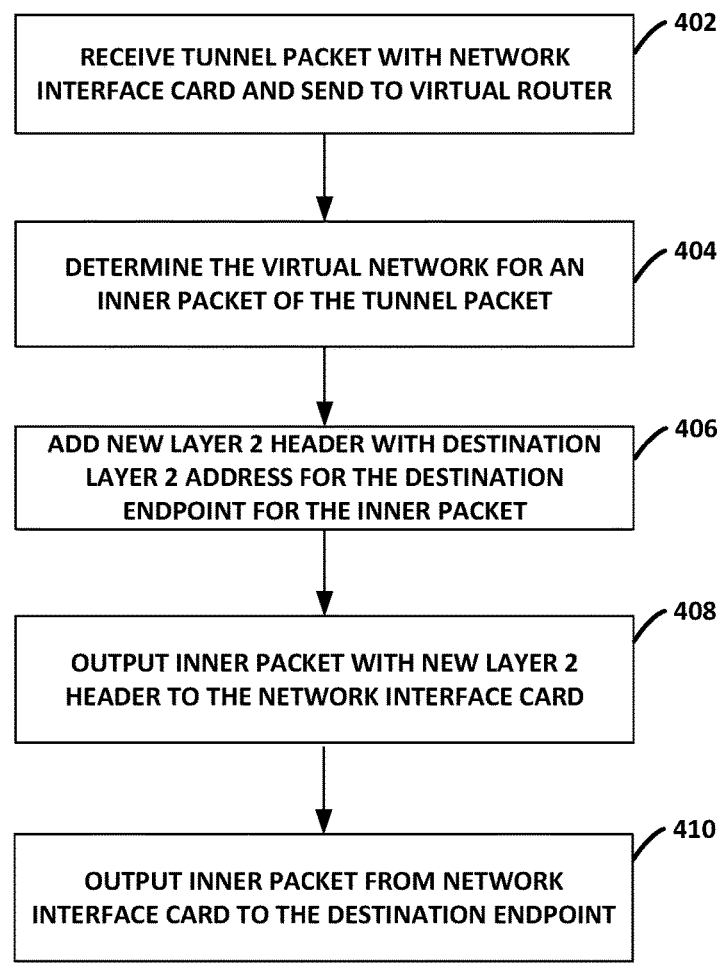
FIG. 4 is a flowchart illustrating an example mode of operation for a computing device, according to techniques described in this disclosure.

FIG. 4 is a flowchart illustrating an example mode of operation for a computing device, according to techniques described in this disclosure. Operation 400 may be performed by computing device 200, any of servers 12, or another computing device. A network interface card 230 may be SR-IOV capable and therefore have one or more virtual functions 217 for the packet I/O physical function 221. The network interface card 230 may be configured to receive tunnel packets from the physical interface 232 and, e.g., apply one or more rules to direct the received tunnel packets, using a virtual function 217 or physical function 221, to a virtual router process 220, 260 executing by a virtual machine hosted by the computing device, a host process, or as part of the hypervisor 214, for instance (402). The virtual router 220, 260 terminates the tunnel and, based on parameters included in the tunnel packets, determines virtual networks for the inner packets of the tunnel packets and destination virtual network endpoints for the tunnel packets. For a received tunnel packet, which may be received for instance via DMA, by reading the tunnel packet from a memory device, and/or by detecting the tunel packet as a set of signals on a bus, the virtual router 220, 260 may strip the outer header including the tunnel encapsulation header to obtain the inner packet of the received tunnel packet. The virtual router 220, 260 may encapsulate the inner packet with a new layer 2 header having a destination layer 2 address that is a layer 2 address configured for the virtual function 217 used for packet I/O by the destination virtual network endpoint of the inner packet (406). The virtual router 220, 260 may output the inner packet with the new layer 2 header to NIC 230 (408), which switches the inner packet with the new layer 2 header to the virtual function based on the destination layer 2 address (410). The virtual router 220, 260 may output the inner packet with the new layer 2 header to NIC 230 via DMA, by storing the tunnel packet to a memory device, and/or by outputting the packet as a set of signals on a bus.

Figure 5:
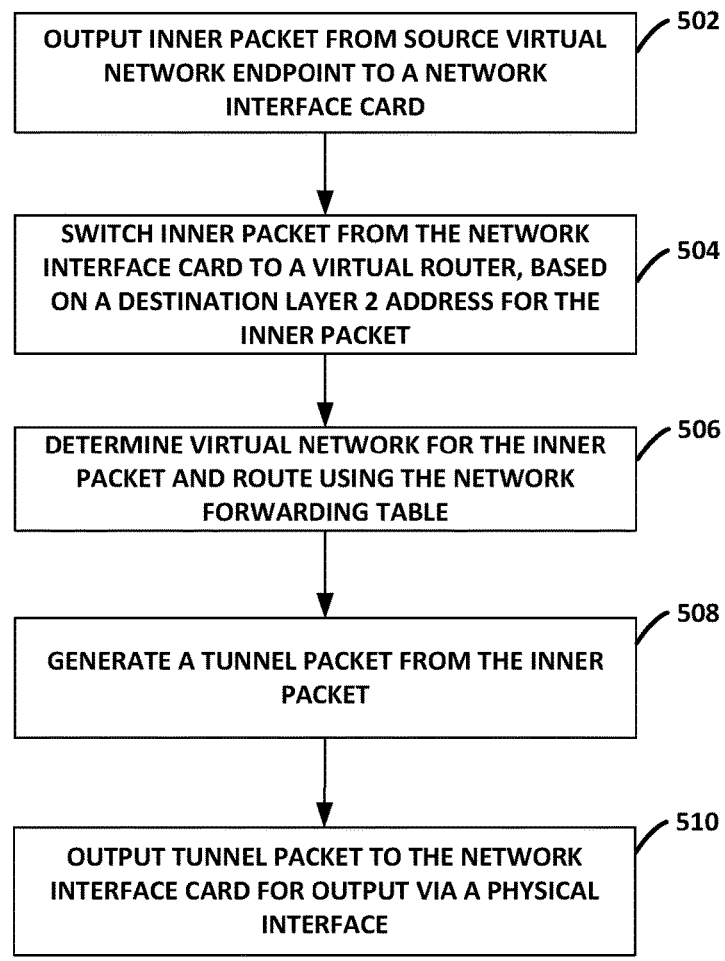
FIG. 5 is a flowchart illustrating an example mode of operation for a computing device, according to techniques described in this disclosure.

FIG. 5 is a flowchart illustrating an example mode of operation for a computing device, according to techniques described in this disclosure. Operation 500 may be performed by computing device 200, any of servers 12, or another computing device. A network interface card 230 may be SR-IOV capable and therefore have one or more virtual functions 217 for the packet I/0 physical function 221. Virtual machine 224A, as a source virtual network endpoint, may output an inner packet with a layer 2 header to NIC 230 using virtual function 217A (502). The layer 2 header may have a destination layer 2 address that is a layer 2 address configured for the virtual or physical function used by the virtual router process 220, 260 for packet I/O. As a result, NIC 230 switches the inner packet and the layer 2 header to the virtual or physical function, which is therefore received by the virtual router process 220, 260 (504). The virtual router process 220, 260 performs virtual routing for the inner packet, based on a network forwarding table for the virtual network that includes virtual machine 224A (506), and adds an outer header to the inner packet including a tunnel encapsulation header indicating the virtual network to generate a tunnel packet (508). The virtual router process 220, 260 outputs the tunnel packet to the NIC 230 for output via physical interface 232 (510). The tunnel packet is switched by the physical network to a physical computing device that hosts the destination virtual network endpoint for the tunnel packet.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A computing device comprising:
   one or more hardware-based processors coupled to a memory device;

a virtual network endpoint configured for execution by the one or more processors;

a network interface card comprising a first hardware component and a second hardware component, wherein the first hardware component and the second hardware component provide separate packet input/output access to a physical network interface of the network interface card, wherein the network interface card is configured to receive a packet inbound from the physical network interface, and wherein the packet comprises an inner packet and a tunnel encapsulation header indicating a virtual network of a plurality of virtual networks, the virtual network including the virtual network endpoint; and a virtual router configured for execution by the one or more processors to receive the packet from the network interface card and determine a destination endpoint of the packet is the virtual network endpoint in part by determining, based at least on the tunnel encapsulation header, a network forwarding table that indicates a layer 2 address is a layer 2 address of the virtual network endpoint, wherein the second hardware component is configured with the layer 2 address, wherein the virtual router is further configured to output, using the first hardware component, in response to determining the destination endpoint of the packet is the virtual network endpoint, the packet back to the network interface card with a layer 2 header having a destination layer 2 address that is the layer 2 address of the virtual network endpoint, wherein the network interface card is further configured to switch, in response to receiving the packet from the virtual router, the packet to the virtual network endpoint and to output, using the second hardware component, the packet to the virtual network endpoint.

2. The computing device of claim 1,
wherein the network interface card comprises a Single Root Input/Output Virtualization (SR-IOV) device,
wherein the first hardware component comprises a physical function of the SR-IOV device,
wherein the second hardware component comprises a virtual function of the SR-IOV device.

3. The computing device of claim 1, wherein the network interface card comprises a Single Root Input/Output Virtualization (SR-IOV) device,
wherein the first hardware component comprises a first virtual function of the SR-IOV device,
wherein the second hardware component comprises a second virtual function of the SR-IOV device.

4. The computing device of claim 1, wherein the virtual router is configured to output the packet to the network interface card by causing a direct memory access transfer of the packet from a memory address space for the virtual router to a memory of the network interface card.

5. The computing device of claim 1, wherein the network interface card is configured to output the packet to the virtual network endpoint by causing a direct memory access transfer of the packet from a memory of the network interface card to a memory address space of the virtual network endpoint.

6. The computing device of claim 1, wherein the virtual network endpoint comprises at least one of a virtual machine and a container.

7. The computing device of claim 1,
wherein the packet comprises a first packet,
wherein the virtual network endpoint is configured to output a second packet, using the second hardware component, to the network interface card,
wherein the network interface card is configured to switch the second packet to the virtual router and to output, using the first hardware component, the second packet to the virtual router, and
wherein the virtual router is configured to encapsulate the second packet with an outer header and output the second packet back to the network interface card for output on the physical network interface to tunnel the packet to another physical computing device that hosts a destination virtual network endpoint for the second packet.

8. The computing device of claim 1,
wherein the virtual network endpoint is configured with a default route to cause the virtual network endpoint to output outbound packets having layer 2 headers each having a layer 2 destination address that is a layer 2 address configured for the first hardware component, and
wherein the network interface card is configured to switch, based at least on the layer 2 headers, the outbound packets to the virtual router and to output, using the first hardware component, the outbound packets to the virtual router.

9. The computing device of claim 1,
wherein the virtual router is configured to, in response to receiving an address resolution protocol request requesting a layer 2 address for a default gateway, output an address resolution protocol reply for the address resolution protocol request that specifies, for the layer 2 address for the default gateway, a layer 2 address configured for the first hardware component.

10. A method comprising:
receiving, by a network interface card of a computing device via a physical network interface of the network interface card, a packet inbound from the physical network interface,
wherein the network interface card comprises a first hardware component and a second hardware component, and
wherein the first hardware component and the second hardware component provide separate packet input/output access to a physical network interface of the network interface card, and
wherein the packet comprises an inner packet and a tunnel encapsulation header indicating a virtual network of a plurality of virtual networks, the virtual network including the virtual network endpoint;
receiving, by a virtual router of the computing device, the packet from the network interface card and determine a destination endpoint of the packet is the virtual network endpoint in part by determining, based at least on the tunnel encapsulation header, a network forwarding table that indicates a layer 2 address is a layer 2 address of the virtual network endpoint, wherein the second hardware component is configured with the layer 2 address;
outputting, by the virtual router in response to determining the destination endpoint of the packet is a virtual network endpoint of the computing device, using the first hardware component, the packet back to the network interface card with a layer 2 header having a destination layer 2 address that is the layer 2 address of the virtual network endpoint; and switching, by the network interface card in response to receiving the packet from the virtual router, the packet to the virtual network endpoint and outputting, using the second hardware component, the packet to the virtual network endpoint.

11. The method of claim 10,
wherein the network interface card comprises a Single Root Input/Output Virtualization (SR-IOV) device,
wherein the first hardware component comprises a physical function of the SR-IOV device,
wherein the second hardware component comprises a virtual function of the SR-IOV device.

12. The method of claim 10,
wherein the network interface card comprises a Single Root Input/Output Virtualization (SR-IOV) device,
wherein the first hardware component comprises a first virtual function of the SR-IOV device,
wherein the second hardware component comprises a second virtual function of the SR-IOV device.

13. The method of claim 10, wherein outputting the packet to the network interface card comprises causing a direct memory access transfer of the packet from a memory address space for the virtual router to a memory of the network interface card.

14. The method of claim 10, wherein outputting the packet to the virtual network endpoint comprising causing a direct memory access transfer of the packet from a memory of the network interface card to a memory address space of the virtual network endpoint.

15. The method of claim 10, wherein the virtual network endpoint comprises at least one of a virtual machine and a container.

16. The method of claim 10, wherein the packet comprises a first packet, the method further comprising:
outputting, by the virtual network endpoint using the second hardware component, a second packet to the network interface card,
switching, by the network interface card, the second packet to the virtual router and outputting, using the first hardware component, the second packet to the virtual router;
encapsulating, by the virtual router, the second packet with an outer header and outputting the second packet back to the network interface card for output on the physical network interface to tunnel the packet to another physical computing device that hosts a destination virtual network endpoint for the second packet.

17. The method of claim 10, further comprising:
receiving, by the virtual network endpoint, a default route to cause the virtual network endpoint to output outbound packets having layer 2 headers each having a layer 2 destination address that is a layer 2 address configured for the first hardware component;
switching, by the network interface card based at least on the layer 2 headers, the outbound packets to the virtual router and outputting, using the first hardware component, the outbound packets to the virtual router.

18. The method of claim 10,
outputting, by the virtual router in response to receiving an address resolution protocol request requesting a layer 2 address for a default gateway, an address resolution protocol reply for the address resolution protocol request that specifies, for the layer 2 address for the default gateway, a layer 2 address configured for the first hardware component.

19. A non-transitory computer-readable storage medium comprising instructions for causing a computing device to:
receive, by a network interface card of the computing device via a physical network interface of the network interface card, a packet inbound from the physical network interface,
wherein the network interface card comprises a first hardware component and a second hardware component,
wherein the first hardware component and the second hardware component provide separate packet input/output access to a physical network interface of the network interface card, and
wherein the packet comprises an inner packet and a tunnel encapsulation header indicating a virtual network of a plurality of virtual networks, the virtual network including the virtual network endpoint;
receive, by a virtual router of the computing device, the packet from the network interface card and determine a destination endpoint of the packet is the virtual network endpoint in part by determining, based at least on the tunnel encapsulation header, a network forwarding table that indicates a layer 2 address is a layer 2 address of the virtual network endpoint, wherein the second hardware component is configured with the layer 2 address;
output, by the virtual router in response to determining the destination endpoint of the packet is a virtual network endpoint of the computing device, using the first hardware component, the packet back to the network interface card with a layer 2 header having a destination layer 2 address that is the layer 2 address of the virtual network endpoint; and
switch, by the network interface card in response to receiving the packet from the virtual router, the packet to the virtual network endpoint and outputting, using the second hardware component, the packet to the virtual network endpoint.

* * * * *